(12) United States Patent
Suntup

(10) Patent No.: US 10,626,857 B1
(45) Date of Patent: Apr. 21, 2020

(54) APPARATUS FOR DISPENSING SMALL QUANTITIES OF HEATING OIL

(71) Applicant: Jeffrey Hale Suntup, New London, CT (US)

(72) Inventor: Jeffrey Hale Suntup, New London, CT (US)

( * ) Notice: Subject to any disclaimer, the term of this patent is extended or adjusted under 35 U.S.C. 154(b) by 0 days.

(21) Appl. No.: 16/385,843

(22) Filed: Apr. 16, 2019

Related U.S. Application Data

(63) Continuation-in-part of application No. 15/264,137, filed on Sep. 13, 2016.

(51) Int. Cl.
| | |
|---|---|
| *B67D 7/08* | (2010.01) |
| *B67D 7/40* | (2010.01) |
| *B67D 7/62* | (2010.01) |
| *B67D 7/84* | (2010.01) |
| *F04B 23/02* | (2006.01) |
| *B67D 7/04* | (2010.01) |
| *B67D 7/24* | (2010.01) |
| *F04B 13/00* | (2006.01) |
| *F04B 49/10* | (2006.01) |
| *F23C 7/00* | (2006.01) |

(52) U.S. Cl.
CPC ............. *F04B 23/025* (2013.01); *B67D 7/04* (2013.01); *B67D 7/243* (2013.01); *B67D 7/40* (2013.01); *B67D 7/62* (2013.01); *B67D 7/845* (2013.01); *F04B 13/00* (2013.01); *F04B 49/106* (2013.01); *F23C 7/008* (2013.01)

(58) Field of Classification Search
CPC ........ F23C 7/008; F04B 13/00; F04B 23/025; F04B 49/106; B67D 7/08; B67D 7/40; B67D 7/62; B67D 7/84; B67D 7/04; B67D 7/044; B67D 7/0442; B67D 7/0476; B67D 7/24; B67D 7/243; B67D 7/845
USPC ....................................................... 222/71–73
See application file for complete search history.

(56) References Cited

U.S. PATENT DOCUMENTS

| | | | | |
|---|---|---|---|---|
| 2,784,747 A | * | 3/1957 | Weempe ................ | B60P 3/2215 141/21 |
| 4,187,962 A | * | 2/1980 | Henry ..................... | B65H 75/40 137/355.22 |
| 4,313,168 A | * | 1/1982 | Stephens .................. | B67D 7/08 705/413 |
| 7,856,998 B2 | * | 12/2010 | Bauer ....................... | B60P 3/14 137/15.16 |

(Continued)

*Primary Examiner* — Paul R Durand
*Assistant Examiner* — Andrew P Bainbridge
(74) *Attorney, Agent, or Firm* — C. Nessler

(57) ABSTRACT

Heating oil is delivered to homes and commercial establishments in a regulation-confirming way by using a portable, self-contained, self-powered apparatus which is carried on a lighter weight truck as cargo. The portable apparatus comprises a skid upon which is mounted at one end a tank, a pump, an air-vapor eliminator, a meter subsystem, and a hose reel mounted on a stanchion. A battery power supply powers the pump. Vent lines run to the tank from the vapor eliminator and the pump in what is called a closed system. Apparatus components are arranged to provide a weight distribution lengthwise that is biased toward a one end of the apparatus when the tank is filled with oil. When carried as cargo in a three-quarter ton pickup truck, apparatus with oil weighs less than 1,500 pounds; when carried as cargo in a half ton pickup truck, the apparatus with oil weighs less than 1,000 pounds.

17 Claims, 3 Drawing Sheets

(56) References Cited

U.S. PATENT DOCUMENTS

| | | | |
|---|---|---|---|
| 7,861,537 B2 * | 1/2011 | Givens | F02B 63/04 |
| | | | 290/1 A |
| 9,440,843 B2 * | 9/2016 | Polzin | B67D 7/845 |
| 10,099,915 B2 * | 10/2018 | Kittoe | B67D 7/3209 |
| 2018/0285847 A1 * | 10/2018 | Pier | G06Q 20/18 |

* cited by examiner

APPARATUS FOR DISPENSING SMALL QUANTITIES OF HEATING OIL

This application is a continuation in part of application Ser. No. 15/264,137, filed Sep. 13, 2016, which is a continuation of application Ser. No. 15/264,137, filed Jul. 29, 2012.

TECHNICAL FIELD

The present invention relates to delivering domestic heating oil to customers of fuel oil dealers.

BACKGROUND

Homes which are heated by burning oil, as are common in the northeastern United States, typically have building code-compliant storage tanks which hold approximately 275 to 330 gallons of heating oil. Heating oil is most often delivered to the home by means of local-delivery tank trucks which hold about 2,800-5,000 gallons of heating oil and have a gross vehicle weight in the range of 32,000 to 60,000 pounds. Since large heating oil delivery trucks weigh more than 26,001 pounds, they are required to have air brakes and must be operated by a driver having many qualifications, as described below. At the customer site, heating oil is pumped from the tank of the truck through a hose pulled from a reel on the truck and to a nozzle at the end of the hose which is inserted into the fill pipe of the customer storage tank. The oil pump is typically driven by the truck engine by means of a power take-off and drive shaft.

Characteristically, oil flows at a high rate through substantial diameter piping and hoses. Generally, the transfer of ownership from one party to the other, for instance, from a licensed heating oil dealer to a home or business owner, is referred to as "custody transfer." The term custody transfer implicates various requirements that mandate meeting industry and legal/regulatory standards that attend commerce. Consumer protection and/or sales tax laws impose standards on the accuracy and recordation of heating oil transfers. As applied to the process of delivering heating oil to a customer, custody transfer means that the heating oil quantity must be metered and recorded accurately, regardless of variables such as flow rate, temperature and viscosity. A printed record, sometimes called a receipt or a ticket, must be produced showing the quantity delivered for the customer's and the dealer's records and to meet government and accounting system requirements.

The components of a familiar large local-delivery heating oil tank truck which include a high flow capacity metering system that implements custody transfer are commonly required to have a Certificate of Conformance pursuant to the National Type Evaluation Program (NTEP certification) of the National Conference on Weights and Measures, Lincoln, Nebr. A Certificate may be issued based on an authorized tester's determination that the system complies with the standards of the United States Department of Commerce, namely, with requirements set forth in National Institutes of Standards and Technology "NIST Handbook 44: Specifications, Tolerances, and Other Technical Requirements for Weighing and Measuring Devices." These requirements are hereafter referred to as the "NTEP certification standard." The NTEP certificate number is must be engraved on an approved system if it is to be legally used in commerce. The metering system of a truck must also pass the accuracy-of-flow standard and other requirements of state regulators. One way of expressing that a system is compliant with laws and regulations applicable to accurate measurement of residential heating oil deliveries is to say that the system is "weights and measures approved."

A commercial objective for heating oil dealers is to maximize the utilization of a tank truck, particularly since they presently can cost from $120,000 to $250,000 each. To minimize the time a truck consumes in pumping oil into the customer storage tank, the pumps of tank trucks typically have high flow rates, for example 40-110 gallons per minute. A typical quantity delivered by tank truck may be in the 100-300 gallon range.

Another objective is to minimize the number of times which a driver and truck have to return to the dealer site or an oil terminal, to refill the tank truck. This leads to a desire to have a truck with as large tank capacity as possible. But using a typical large truck can present a problem when a driveway, roadway, or bridge has a load limit below that of the weight of even a partially loaded local-delivery heating oil tank truck.

A mosaic of federal, state, and local laws and regulations—heightened in recent years by homeland security concerns, must be complied with if a dealer owns and operates a conventional heating oil tank truck. They include U.S. Federal Hazardous Materials Regulations relating to transport of hazardous and combustible liquids and laws and regulations aimed at protecting the environment and the public, avoiding fire risk, avoiding terrorist attacks, etc. Periodic vehicle checks are mandated; a driver must make an inspection of the truck at the start and at the end of the first daily use, tire inflation must be systematically checked, the truck must carry a fire extinguisher, etc. State motor vehicle authorities, federal department of transportation officers, local/state police, and homeland security officials are known to make in-yard and on-the-road inspections. Fire marshals and insurers may impose other requirements. A truck which carries hazardous materials including heating oils is required by federal law to display specific kinds of placards on the front, rear and both sides, indicating the class of material which is being carried. In the common parlance, when one says that a motor vehicle must be "placarded," that communicates that the vehicle must meet certain federal standards which include making the required placard displays.

The driver of a heating oil tank truck driver must be a professional: First, the driver must have a commercial driver license (CDL). That requires passing certain background checks, medical tests, and special driving tests. The driver must meet higher performance standards than regular drivers, both while driving a heating oil tank truck and while driving other ordinary vehicles, including personal vehicles. Time spent driving a heating oil tank truck—referred to as "hours of service"—is regulated. There are federally required random drug tests. In addition, the driver of a heating oil tank truck must have endorsements to his or her CDL license, including those for carrying hazardous materials, for operating a tank truck, and for operating a vehicle equipped with air brakes. Recent anti-terrorism measures require a Transport Worker Identification Card (TWIC) if the tank truck is driven into an oil terminal for a re-fill or onto certain other sites that are deemed important to the U.S. Department of Homeland Security. Large local-delivery heating oil tank trucks tend to have high centers of gravity compared to non-tank trucks, and the contents might surge or slosh around and induce instability; thus special driver diligence is required.

The requirement for a CDL with requisite endorsements limits the number of people who are available to be drivers of local-delivery heating oil tank trucks. Understandably, a person who meets the requirements can demand higher wages than can a lesser-licensed person.

In general, conventional large local delivery heating oil tank trucks are costly to operate. The trucks weigh a lot and must be kept running during the pump-discharge of heating oil, The trucks get low fuel mileage, commonly in single-digit miles per gallon. Sending a large heating oil tank truck and qualified professional driver to a customer's site is costly in terms of labor and operating costs; and the dollar mark up on a small quantity of heating oil can easily be insufficient to cover the costs.

With the greatly increased price of heating oil in recent years, presently $3-4 per gallon in northeastern U.S., there has been a tendency for less affluent homeowners to decline delivery of 100 or more gallons at a time, because they wish to avoid the dollar outlay. Instead, a number of consumers seek delivery of smaller quantities, even in the range of 1 to 5 to 25 gallons at a time. Heating oil dealers encounter other situations when small quantities could be appropriate. For example, if a consumer runs out of heating oil at an inopportune time, such as in the middle of the night, mobilizing a qualified driver and tank truck, and paying the driver for a requisite minimum number of hours can be costly. Yet, all the customer needs is a few gallons, to last until the next day or two when a driver can make a larger delivery as part of his regular tank truck delivery route.

Dealers who operate conventional large local-delivery heating oil tank trucks are typically not capable of meeting needs for small quantity deliveries of the kind just mentioned: They cannot easily dispense and/or accurately meter small quantities of oil, particularly in the quantities such as 1, 5, 10 or less than 25 gallons while using a large weights and measures approved tank truck. While some large tank trucks may be able to dispense such a small quantity of heating oil, such small a quantity cannot be accurately measured in conformance with NTEP certification standards, in context that the pump and metering system are configured for handling large quantities and high flow rates, as mentioned above.

There is another problem which tank truck-using dealers face: It relates to bad weather conditions which make it difficult for a tank truck to reach certain sites, for instance, when there are snow and ice conditions and the terrain is steep. Typical large local-delivery heating oil tank trucks have rear wheel drive only and are not allowed to be fitted with tire chains (because of the risk of a loose chain penetrating the oil tank). Thus, there can be times when it is physically very difficult to service a customer.

Diesel fuel meets different technical requirements than does heating oil, as explained further below in the Description. Diesel fuel is used in internal combustion engines. Most diesel oil for consumers is sold in roadside service stations. To deliver diesel oil to construction and agricultural vehicles and the like which are in the field, it has been a familiar practice to mount small diesel oil tanks, often a 55 gallon drum, on pickup trucks and the like and to drive to the vehicle location. While typically there is only a pump system for transfer of the diesel fuel from the tank on the truck to the tank of the vehicle, a metering or measuring system of some sort may be used. This kind of distribution mode typically does not involve a commercial custody transfer from a dealer to a customer of the kind that triggers regulatory requirements; and any requirements would not be of the specialized nature relating to custody transfer of heating oil delivery to residential and commercial buildings.

No. 2 heating oil, having a flash point of 126-204 degrees F., is classified as a combustible liquid. Some have improperly characterized heating oil as a flammable liquid—which it is not. Examples of flammable liquids include gasoline (flash point −45 degrees F.) and propane (flash point −156 degrees F.). For the differences between combustible liquids and flammable liquids, and how they are stored, transported and handled, see 29 Code of Federal Regulations 1910.106 and familiar handbook data. Equipment used for higher flash point combustible liquids such as heating oil does not have to meet the same standards as equipment used for flammable liquids such as propane and gasoline. As a corollary, equipment designed for use with flammable liquids may be inappropriate or inefficient if applied to handling combustible liquids.

Diverse manufacturers have commercially offered portable wheeled and skid-mounted systems for transporting and/or pumping oils or other liquids, beyond heating oil and diesel fuel. However, many of the prior art ways of carrying and delivering non-heating oil products cannot be used by licensed heating oil dealers because those ways do not and cannot meet commercial standards and the government regulations and standards mentioned above. Thus, there is a need for a better and more flexible way for accurately delivering small quantities of heating oil to commercial customers in an economic way, where the heating oil is transported and metered in a manner acceptable to regulatory and tax authorities and standards setting organizations.

SUMMARY

An object is to provide a self-contained and self-powered, portable heating oil transfer apparatus for dispensing small quantities. Another object of the invention is to provide a means for a commercial dealer to delivery small quantities of heating oil to consumers in a manner which comports with regulatory and tax requirements and which is economically more advantageous than using a common large heating oil tank truck. Another object is to deliver small quantities of heating oil to consumers in way which avoids having to have a CDL licensed driver and avoids the costs of meeting standards which large local-delivery heating oil tank trucks must meet.

In accord with an embodiment of the apparatus used in the present method invention, a heating oil delivery apparatus comprises a heating oil tank of about 119 gallons capacity or less at the rear end of the apparatus; a pump, preferably having a flow rate of about 2-22 gallons per minute, optionally 2-14 gallons per minute; an air and vapor eliminator that is typically integral in a meter assembly that includes a meter subsystem which meets NTEP certification requirements; a battery for powering the pump; and a hose that may be pulled off a hose reel which is mounted on a stanchion. The air and vapor from the eliminator runs through a pipe line to a fitting is at the top of the tank, just below a cap on the fitting. In like fashion, a valve-controlled line runs from the pump to the tank top fitting to vent air from the pump. The cap inhibits the discharge of vapor or air to the atmosphere, while allowing air to enter as oil is removed. The system is what is often referred to as a closed system.

The apparatus components are mounted on a skid. The tank is at the rear end of the apparatus and the meter (and its display and ticket-printer) and operating controls are at the front end. The hose reel is oriented to discharge hose lengthwise from the front end of the apparatus.

Since embodiments of the apparatus are portable, they may be removably carried as cargo, secured by tie-downs in the bed of a pickup truck or other vehicle, preferably with the tank nearest to the cab of a pickup and with the hose and meter assembly conveniently available to a driver at the rear or tailgate end of the truck. The limited tank capacity and cargo aspect mean that a vehicle carrying the apparatus does not have to meet the same regulatory requirements as does a large local-delivery multi-thousand gallon tank truck.

Apparatus embodiments have configurations wherein, when the tank is empty, the lengthwise distribution of weight enables good handling and placement of the apparatus in the bed of a pickup truck. And the tank end of the apparatus is positioned nearest the cab of the truck, as the tank is filled with oil, the weight of the apparatus desirably shifts forward.

Self-powering of apparatus embodiments may be accomplished by mans of one or more, preferably two, storage batteries which drive a DC motor powered pump. An exemplary apparatus with a filled tank has a weight of no more than 1500 pounds and can be transported along public roads while secured in the bed of a pickup truck or the like which has a gross vehicle weight rating of less than 26,001 pounds, typically 10,000 pounds or less. Operation of such a vehicle does not require a CDL licensed driver, nor a driver meeting other requirements (license endorsements) which are related to operation of a common 26,001 pound or more large local-delivery heating oil tank truck.

In accord with an embodiment of the method of the present invention, a dealer can deliver home heating oil to a customer using two different modes: First, to make typical deliveries of 119 or more gallons at a time, the dealer uses a typical large local-delivery heating oil tank truck, one having a capacity of a couple thousand gallons or more (i.e., more than 119 gallons). The truck is driven by a CDL licensed driver meeting the other requisites mentioned above. Second, the same customer is at other times delivered smaller quantities of heating oil, such as in the 1 to 25 gallon range, and up to almost 119 gallons, by means of the invention apparatus carried as cargo on a less-than-26,001 pound gross vehicle weight rating truck, which truck is driven by a driver who does not have a CDL, or by a driver who lacks one or more of the endorsements required for lawful operation of the conventional large local-delivery heating oil tank truck used for the first mode delivery. The times when the second mode is used to deliver a smaller-than-119 gallon quantity may include situations where the customer is short of funds or for other reason only wants a small quantity of heating oil, when there is a run-out in the middle of the night, or when road conditions are extremely adverse, etc.

The inventive method enables a commercial heating oil dealer to make deliveries of both small and large quantities while being in compliance with motor vehicle laws and regulations and with approved weights and measures procedures, particularly including NTEP certification requirements. And the dealer's operating and labor costs are reduced compared to the costs of a dealer who only uses a common large local-delivery heating oil tank truck to service customers. Furthermore, the invention will permit heating oil deliveries that would otherwise be delayed or less practical or less cost effective, or which due to weather conditions would be impossible.

The foregoing and other objects, features and advantages of the present invention will become more apparent from the following description of preferred embodiments and accompanying drawings.

DESCRIPTION

Figure 1:
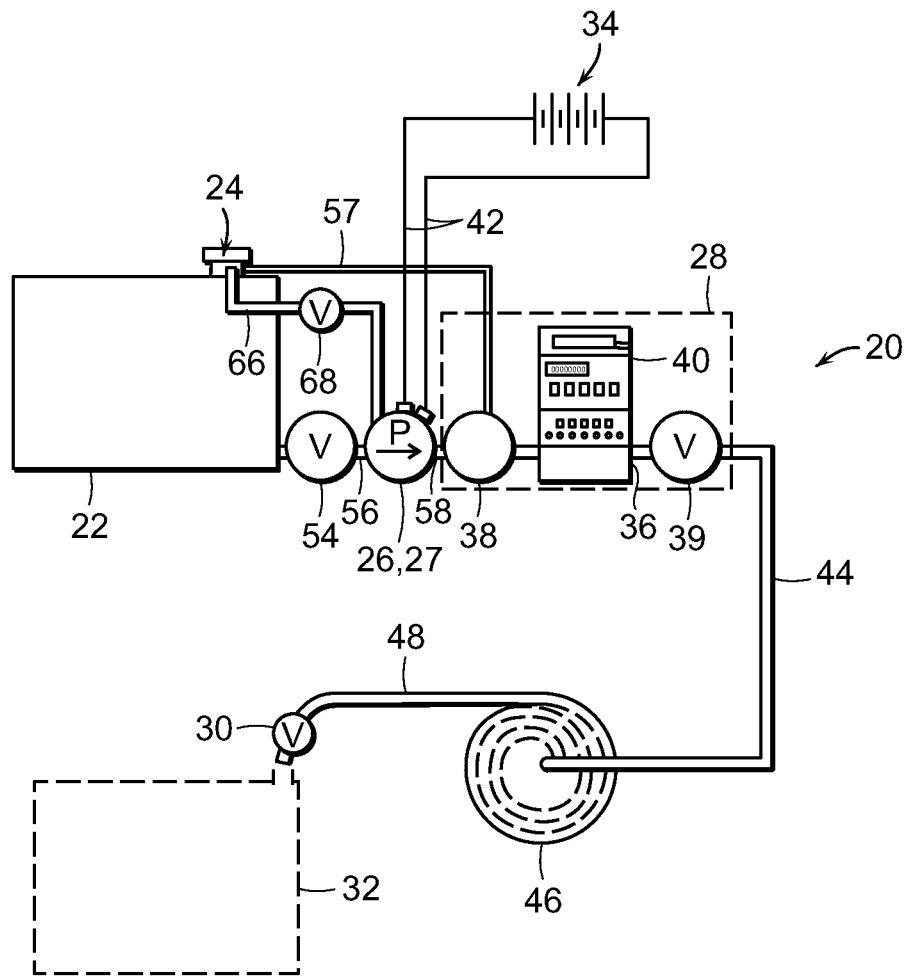
FIG. 1 is a schematic diagram of apparatus of the present invention.

Referring to the Figures, an invention embodiment apparatus 20 is comprised of several elements all of which are mounted on skid 60. The apparatus has a rear end 80 and a front end 82 and an associated length. The terms "front" and "back" are used for convenience of description here. Centerline CL delineates the nominal midpoint or center point of the apparatus length and the location of a transverse midplane. See FIG. 2.

Situated at the rear end of the apparatus is a compactly configured storage tank 22 having a filler port 23. Cap 24, described below, is attached to the port 23. The tank is suited for carrying no more than 119 gallons of heating oil. Pump 26 is driven by an integral motor 27, preferably a DC motor powered by electric lines 42 running from battery 34. Pump 26 draws oil from tank 22 through shut-off valve 54 and pipe line 56; oil from the pump flows through line 58 to air and vapor eliminator 38, then through meter subsystem 36, then through preset quantity control valve 39, then to the hose 48 wound around hose reel 46. At the end of the hose is nozzle valve 30.

To keep the center of gravity low, the forgoing components are mounted on the top surface of the skid, while hose reel 46, being on stanchions, is at an elevation above the surface. There may be interposing supports or brackets for the components which are mounted on the surface of the skid.

During delivery of oil, the oil flows from the meter subsystem 28 through a pipeline 44 to hose 48 of hose reel 46, and then through hose 48 and nozzle valve 30 and into a customer tank/container, e.g. into a tank 32 shown in phantom in FIG. 1. Generally stated, the pump is in fluid communication with the tank; the meter subsystem is in fluid communication with the pump, and the hose of other discharge conduit is in fluid communication with the meter subsystem.

The meter subsystem comprises the combination of an air and vapor eliminator 38, a flow meter 36, the preset quantity control valve 39, and the data display and printing register 40. Meter 36 is preferably of the piston-positive displacement type described below. Connected to the meter is register 40 which displays the oil quantity which has been pumped. Register 40, which faces toward the front end of the apparatus, also includes an integral printer for producing a paper receipt or ticket. A typical commercial meter assembly may comprise the elements 38, 36, 39, 40 as a single unit.

Cap 24 of tank 22 is preferably a so-called bulkhead fitting, familiar in heating and fuel oil industry. The bulkhead fitting is crafted to prevent escape of vapors or liquid but at the same time to allow air to enter the tank as heating oil is removed from the tank by the pump. Air and vapor removed from the oil by the air and vapor eliminator is flowed through pipe line 57 which runs from the air and vapor eliminator 38 to the port 23 at the top tank 22. Pipe line 66 runs from the pump to the filler port 23, to enable air trapped within the pump to vent into the tank. Normally closed valve 68 is in line 66, thus enabling a user to employ the function of the line 66 when it is necessary, for example, when air has been drawn into the pump because all the oil has been pumped from the tank.

With respect to containing vapors and liquid, a system as described here that includes a tank with an aforesaid bulkhead fitting type of cap, and the components serially connected by sealed pipelines or fittings, is commonly called a "closed system" even though air is selectively allowed to enter the tank through the cap and oil is selectively discharged from the hose end.

Figure 2:
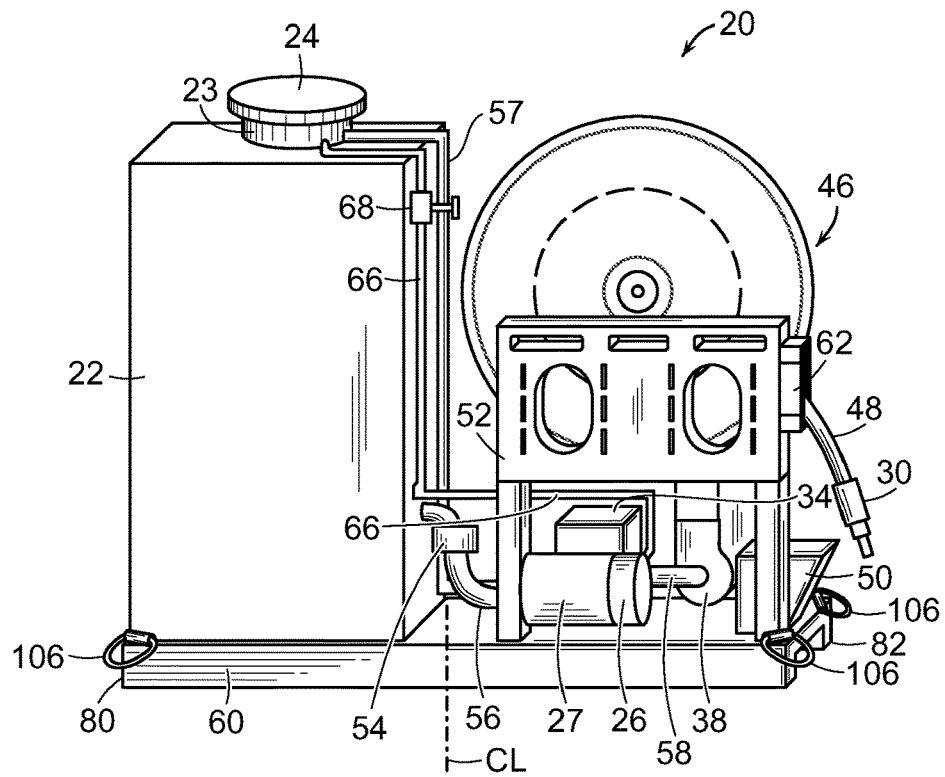
FIG. 2 is a side view of an embodiment of apparatus of the invention, including a skid.
Figure 3:
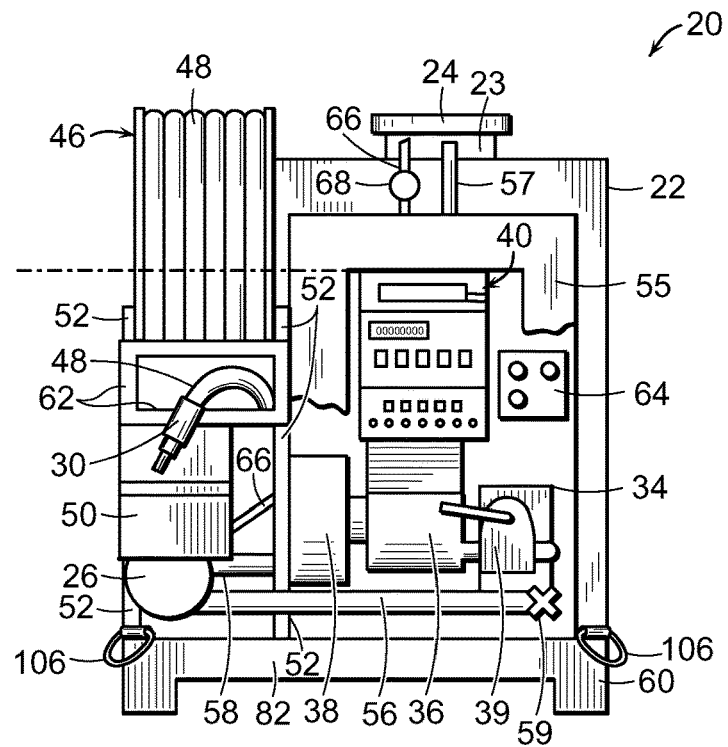
FIG. 3 is an end view of the apparatus in FIG. 2.

As shown in FIG. 2 and FIG. 3 the free end of the hose runs through guide 62 which is of the fairlead roller type. To dispense heating oil, an operator pulls hose from the reel in an amount sufficient to reach a customer container 32. The operator manipulates nozzle valve 30 at the free end of the hose, to flow a desired quantity of oil into container 32, for example, into a customer's heating oil storage tank. There may be other fittings and devices in the oil flow path.

Figure 4:
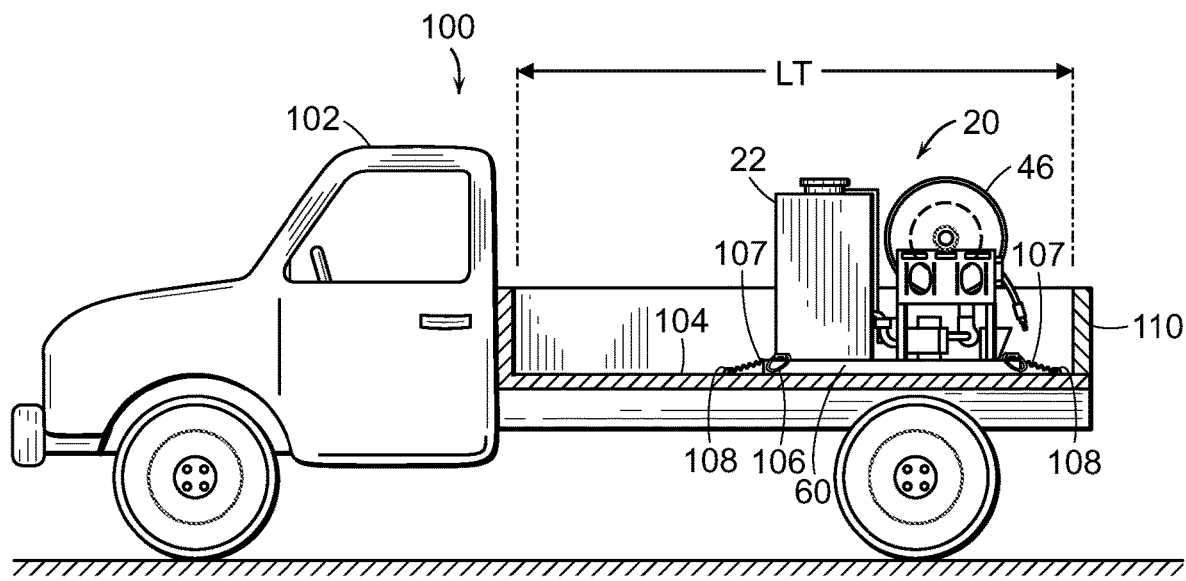
FIG. 4 is a side view of a pickup truck, with a portion of the truck bed cut-away, and the apparatus shown in FIG. 1 and FIG. 2 carried in the bed.

Referring to FIG. 2 and FIG. 3, as mentioned above, apparatus 20 is mounted on a preferably rectangular skid 60, so that it can be moved as a portable unit. For example, the apparatus can be set within the bed 104 of a pickup truck 100 having a driver cab 102, as shown in FIG. 4, preferably secured by tie-downs connected to D-rings at the skid corners. And the apparatus can be transferred easily from one vehicle to another or to the ground for stationary operation as part of a dealer's commercial operations. As shown in FIG. 4, the lengths of the apparatus (and its skid) and the truck preferably are aligned and preferably the front of the apparatus 20 faces toward the rear of the pickup truck, so that there is easy operator-access to the hose reel, the meter, the display, the delivery ticket printer, and the main shut off valve handle 59.

Portability of the apparatus is an important feature, since if the apparatus were to be attached to truck 100 or another vehicle in permanent fashion, the vehicle could be designated a heating oil tank truck, thus invoking regulatory requirements. To prevent movement during operation of the truck along a roadway, apparatus 20 is typically secured at four or more points to the bed 104 of truck 100 by tie downs 107 which connect D-rings 106 at the four corners of skid 60 to fittings 108 on the truck bed. There may be more than four tie downs. The tie downs may be straps, chains, binders, etc.

Tank 22 is preferably a welded steel rectanguloid positioned at the rear end 80 of the skid 60, as shown. Tank 22 may have other shapes. Tank 22, or any substitutional multiplicity of smaller tanks on the skid, has a volume capacity of about 119 gallons, but less than 119 gallons, to avoid triggering application of laws, regulations and other requirements that attend large local-delivery tank trucks. (All references herein to "gallons" are the U.S. gallons.) The tank capacity may be less than 119 gallons, but an about 119 gallon tank is preferred because it minimizes the frequency with which a driver has to refill the tank when making deliveries.

Hose reel 46 is a conventional commercially known unit that is power-assisted by a drive means (not shown) to aid reeling hose 48 back onto the reel when dispensing of heating oil has been completed. A hand-cranked reel may be alternatively used. Hose reel 46 is supported on stanchion 52 that extend upwardly from skid 60. Reel 46 is configured so that hose pulled from the reel is fed from the front end of the apparatus in the lengthwise direction, which corresponds with the direction of length LT of the bed of the truck. A driver delivering oil may of course pull the hose that is drawn off the reel sideways relative to the apparatus length, to reach a desired receptacle for heating oil. In alternative embodiments, the hose reel may be oriented to discharge the hose in a direction transverse to the apparatus length. In the generality of the invention, there is a dispensing conduit in fluid communication with the meter subsystem and that conduit may comprise, as an alternative, a simple length of hose or a pipe, each without any hose reel.

With reference to FIG. 3, control system housing 55 is also mounted on skid 60; it is shown with its bottom portion cut away. Housing 55 protects portions of the meter subsystem and contains control panel 64. It preferably has a lockable door (not shown). Control panel 64 comprises electric switches and protective devices for controlling operation of the pump, for energizing other electric parts of the system and a light, and so forth. Under the meter subsystem and control panel and just above the skid top is the handle 59 that turns shut-off valve 54 through an extension. With reference to FIGS. 2 and 3, it can be seen that the stanchions of the hose reel are configured so that the lower edge of the hose reel is at an elevation which is higher than the elevation of the pump 25, pump motor 26, and battery 34. (Two separate-unit batteries 34 are preferred.) It can also be seen in the end view of FIG. 3 that the typically heavy batteries are laterally displaced with respect to the lengthwise center of the apparatus (i.e., to the right in the Figure), thus helping balance the other-side weight of the pump and hose reel.

Pump 26 which preferably has an integral direct current motor 27, is chosen for a flow capacity in the range of 2-22 (alternatively 2-14) gallons per minute (GPM). When used with an alternative AC motor the flow rate may be 2-29 GPM.

The combination of pump 26 and meter subsystem 28 are capable of accurately transferring and measuring small quantities of heating oil. For example, between 1 and 25 gallons can be transferred and accurately controlled and measured, and a ticket or other permanent record can be produced showing the quantity dispensed to the nearest one-tenth of a gallon. The comparative low flow rate of the pump of the invention apparatus makes it suited for filling small containers, such as a 5 gallon container. That contrasts with the large flow rate pumps characteristic of many large local-delivery heating oil tank trucks mentioned in the Background, for example one that is capable of flowing 40-110 GPM. Not only are those pumps poorly suited for pumping of small quantities, the meter subsystems of such tank trucks do not provide accurate metering of less than 25 gallon quantities.

Apparatus 20 preferably includes skid 60 which is, for example, about a 40 inch by 48 inch rectangle of fabricated steel; it has a footprint small enough to fit in the bed of a common pickup truck. The term "skid" shall be construed as embracing any structure which functions as a base sufficient to carry the apparatus components and enable them to be moved as an integral unit while functionally interconnected. The tank and stanchions may share structural elements. Components shown directly mounted on the skid top surface in the exemplary illustrations may be indirectly mounted on the skid; for example, they may be spaced apart by brackets or holders. The tank, pump, and piping, control housing and skid are preferably constructed prevalently of iron alloy materials; alternative materials including aluminum and copper alloys may be used.

An embodiment of apparatus 20 is constructed in a manner which economizes material and weight. Thus, when tank 22 is empty, an exemplary apparatus 20 which includes one or two storage batteries 34 may weigh up to about 500-600 pounds. When tank 22 is substantially filled (i.e., nearly 100% filled) with just under 119 gallons of heating oil, the oil weighs about 840-880 pounds (depending on oil density, which may vary between 7.05 and 7.4 pounds per gallon, and which typically is about 7.2 pounds per gallon). And the total weight of the heating oil-filled preferred apparatus is no more than 1,500 pounds, and thus within the capacity of a common commercial 1,500 pound load rating pickup truck or van (familiarly called a "three-quarter ton motor vehicle" or "three-quarter ton pickup truck").

In embodiments of the invention, more than half the weight of an oil-filled apparatus is represented by the oil weight. Thus when the tank is filled or near full, more than half the weight of an apparatus will be rearward of nominal center-point of the apparatus, as indicated by the line CL in FIG. 2. As discussed below, when such an apparatus is carried in the bed of a pickup truck as cargo with the apparatus heavy rear end (i.e., the tank end) positioned near to the cab of the pickup truck, the pickup truck will have a desirable weight distribution.

In an alternative apparatus embodiment, tank 22 has a capacity substantially less than 119 gallons, for example, about 70 gallons, and the total weight of the apparatus with a tank filled with oil is about 1,000 pounds, which is within the load capacity of a 1,000 pound load rating truck (familiarly called a "half-ton motor vehicle" or "half-ton pickup truck."). The oil-filled about 1,000 pound apparatus will have more than half its weight rearward of the lengthwise center-point Still lighter weight apparatuses are mentioned below.

The apparatus 20 may be most conveniently moved into and out of the bed of a pickup truck 100 by using different methods, including a common fork-lift truck (where the forks extend from a boom), a crane of the overhead or gantry type, or a functionally-alike apparatus. As an example, to load the apparatus on the pickup truck, an equipment operator lifts the apparatus up and the lowers into the truck bed 104; alternatively an operator slides the apparatus possibly with the use of ramps. FIG. 4 shows the resultant combination of apparatus 20 and truck. The apparatus rear end (also sometimes called the tank end) is near the cab of the truck and the apparatus front end with the control panel, meter and hose reel are at the rear end or tailgate end 110 of the truck, where they are readily accessible by the driver for delivering heating oil.

Apparatus 20 will be best moved onto and off of the truck at times when the tank is empty or near-empty; at other times when the quantity of oil in the tank is "just right," to balance the apparatus weight about the nominal center point CL. The configuration of embodiments of apparatus 20 makes such lifting easy because it enables achieving the aforementioned lengthwise weight distribution while at the same time providing a compact apparatus with accessible controls and hose/hose reel.

In particular, when the tank is empty or near empty the weight of an embodiment of the apparatus is either nearly in balance lengthwise relative to the mid-point CL or the weight is biased toward the apparatus front end, Thus, when oriented for placement in the bed of a pickup truck or the like, an apparatus will set stably on the forks of a fork-lift truck. When the weight is in balance about the center point. the apparatus will tend to hang level from a crane hook. After such apparatus 20 is set within the bed of the pickup truck 100 with the tank end (rear end) of the apparatus near to cab 102 of the truck 100, tank 22 may be filled with oil. That filling will change the weight balance of the apparatus relative to the length mid-point CL. More specifically, it will cause more than half of the weight to be biased forward of the mid-point CL. The weight of the apparatus will is as a corollary shifted toward the front end of the truck, so the front wheels desirably better share in carrying the load with the rear wheels.

A preferred embodiment of apparatus 20 has a favorable weight distribution in the vertical axis direction as well, to help stability of the apparatus as it is carried as cargo within the bed of a pickup truck. For example, heavy batteries are at a vertical low point, directly on the skid top surface, as is the pump. The hose reel, being mounted on stanchions, is at a higher elevation relative to the top of the skid and take eases pulling of hose from the reel.

As is well-known, familiar half-ton and three quarter-ton capacity pickup trucks and vans typically have a gross vehicle weight rating of less than 10,000 pounds. That is well below the 26,001 pound threshold weight which requires a CDL. Therefore a driver of a vehicle carrying the invention apparatus need only have a regular driver's license. No driver's license endorsements related to driving a large local-delivery heating oil tank truck are required for such pickup trucks and vans when they are carrying the invention apparatus as removable cargo. And the vehicle carrying the invention apparatus does not have to be placarded, or to have a fire extinguisher, or to be otherwise treated like an ordinary large local-delivery heating oil tank truck.

Alternatively, a trailer towed by a truck or automobile may be used to carry the invention apparatus. In further alternatives, apparatus 20 or the like may be carried on a boat, barge, sled, airplane, helicopter, etc. In a still further alternative, the apparatus may be used in a stationary mode for fuel oil dealer dispensing of heating oil, or for dispensing other some other combustible liquids.

In an alternate embodiment of the invention, an electrical motor driven pump 26 may be powered by other than storage batteries. For example, the pump may be powered by direct current electric system of the truck or other motor vehicle which is used to transport the apparatus, separately or in combination with a storage battery 34. A solar panel may also be used to recharge the battery. A fuel cell or an internal combustion engine powered generator may be used. In another alternative, AC power drawn from a private or public utility alternating current system may be used. In the generality of embodiments of the invention, the apparatus electric power source may be selected from the group comprising: an electric storage device mounted on the skid or separated from the skid, an electric generating device mounted on the skid or separated from the skid, a DC electric system of a motor vehicle, and an AC power system, or combinations of the foregoing.

In the generality of the invention, the meter subsystem includes means for acquiring and recording the quantity of heating oil delivered in weights and measures approved fashion, including in a way which meets the NTEP certification standard. A preferred and currently conventional way of providing a permanent record of an oil delivery is by means of a printer which produces a hard paper copy. In the scope of the claimed invention any reference to printing or printing a ticket about the heating oil quantity delivered shall embrace other means for outputting and recording data.

As used herein, "residential storage tank" refers to a tank, typically of 250 to 330 gallons capacity, which is building-code approved for use inside or outside a residential dwelling. The term "residential" should not be considered limiting, since conventionally, the same name is applied to such kind of tank when it is used in a commercial building.

The invention apparatus as described is particularly designed and constructed for handling home heating oil (HHO), often also called No. 2 heating oil, and delivering it for heating purposes at residential, commercial, and other buildings. HHO conforms to ASTM standard D396 (ASTM International) and is described more particularly below. As indicated in the Background, the distribution and sale of HHO is particularly regulated, in distinction to how other oil products, including diesel engine fuel oil, may be regulated. Other aspects of HHO are presented further in this description. Heating oil which is subject of this description is a combustible liquid and not a flammable liquid, according to familiar international and U.S. government regulatory definitions.

An exemplary embodiment of the present invention has met the NTEP certification standard mentioned in the Background; namely, it will comply with the National Institutes of Standards and Technology requirements set forth in "NIST Handbook 44: Specifications, Tolerances, and Other Technical Requirements for Weighing and Measuring Devices" and will be subject to a Certificate of Conformance pursuant to the National Type Evaluation Program (NTEP certification) of the National Conference on Weights and Measures, Lincoln, Nebr. When the exemplary apparatus flowed oil at rates in the range of 2 to 24 GPM (for DC power supply) and 2-29 GPM (for AC power supply), it was in conformance with accuracy class 0.5*, as set forth in Handbook 44. That included an acceptance tolerance of 0.3 percent for certain heating oil quantities in amounts of 50 gallons or less. An exemplary apparatus 20 was issued a National Type Evaluation Program Certificate of Conformance (No. 11-112) by the National Conference on Weights and Measures and that is marked on commercial embodiments of the apparatus.

Thus, a commercial embodiment of the invention apparatus meets heating oil dealer needs by being weights and measures approved; and since the tank capacity is less than 119 gallons, and since the apparatus is carried as cargo when on a pickup truck or the like, there is no requirement to display placards and meet various other costly heating oil tank truck related standards mentioned above.

An exemplary meter subsystem comprises a Murray brand 1½ inch pipe diameter size petroleum meter Model TMS 682, having an air and vapor eliminator accessory, a strainer, a display register, a ticket printer and a pre-settable volume control valve (Murray Equipment Inc., Fort Wayne, Ind.). The pre-settable volume control valve enables a delivery man to input a desired quantity of fuel, e.g. 20 gallons, and the pre-settable control valve will automatically close and stop the flow of heating oil when that quantity has flowed through the meter. Other commercial meter subsystem units or other combinations of devices may be used to carry out the functions of meter subsystem provided the resultant combination meets NTEP certification standards.

An exemplary pump 26 is a Model 489G-95, sub-code 1011 pump (American Machine Tool. Co., Inc. Royersford, Pa.). Other commercial pumps of comparable function may be used.

The present invention includes a new and different way for a commercial fuel oil dealer to deliver heating oil to residential and commercial customers. The invention enables a dealer to periodically deliver to a customer residential storage tank or other container a small quantity of heating oil, such as 1, 5, 25 gallons, and up to almost 119 gallons, in an economic manner, while meeting regulatory requirements with respect to metering and ticketing, and while conforming with motor vehicle laws and regulations. That compares with using the kind of conventional local-delivery heating oil tank truck which has a capacity of a couple thousand gallons or more (i.e., more than 119 gallons), as described in the Background, where the tank comprises a pump and meter subsystem that are geared toward delivering 25 gallons or more in a high flow rate manner. Such a tank truck is not suited for delivering less-than-25 gallon quantities for reasons previously mentioned.

The method of the present invention comprises providing an apparatus for pumping and metering and ticketing home heating oil, which apparatus complies with the NTEP certification standard. The apparatus also comprises a heating oil tank having a capacity of about 119 U.S. gallons or less. The method further includes: transporting the apparatus as removable cargo on a motor vehicle having a gross vehicle weight of less than 26,001 pounds to the point of dispensing heating oil; flowing heating oil through the apparatus by means of an electric powered pump at a rate of 2 to 29 GPM for a total delivery quantity of between 1 and 25 gallons, alternately up to just under 119 gallons; and preferably delivering said quantity of heating oil to a customer's heating oil storage tank, such as are commonly associated with a dwelling, commercial building or other building, where the tank has a capacity of more than 250 gallons.

Thus, in an embodiment of the method invention, the process is as follows. A heating oil dealer may deliver to a particular customer oil in quantities of more than 25 gallons, typically 100-200 gallons, during the season of high daily consumption, such as during the winter time using a placarded tank truck of more than 119 gallons capacity, typically 2,800 to 5,000 gallons, maybe having a gross vehicle weight of more than 26,001 pounds.

And the same heating oil dealer will deliver at another time to the same particular customer oil in quantities in the range 1 to 5 to 25 gallons, up to about 119 gallons. Such a second delivery may be made when it is appropriate, for example, during the season of low daily consumption, or when the customer is short on money for heating oil, or in the event of emergency need because of the customer running out of heating oil, or when there are adverse road conditions for the dealer's ordinary large local heating oil delivery tank trucks. When the second delivery is made, the dealer will use the portable skid-mounted apparatus of the present invention, as described herein, in combination with a truck or equivalent vehicle. The gross vehicle weight of the vehicle carrying the apparatus with heating oil in the apparatus tank is less than 26,001 pounds. The vehicle used for the second delivery is driven without placards along public roads by a non-CDL qualified driver or by a CDL driver lacking one or more of the required heating oil tank truck related endorsements. The second commercial delivery is made in a way which complies with motor vehicle, transport, environmental and tax laws. The truck with a full tank will carry slightly will carry less than 119 gallons of home heating oil and the weight of such oil will be between about 840 to about 880 pounds, typically about 856 pounds, dependent on the exact density of the oil. See the discussion above.

In use of apparatus 20 which has preferably been placed in the bed of a pickup truck or another type of small truck as described above, the apparatus is carried as cargo in the bed to the location of the customer residential storage tank or other container. With reference again to FIG. 1 to FIG. 4, the delivery person then opens the heating oil tank shut-off valve 54 of apparatus 20 by turning handle 59; then actuates a master power switch on the electric panel 64 to provide electric power to the pump motor 27 and to any hose reel driver; then inserts a blank heating oil delivery ticket receipt into the display and ticket printer 40 of meter subsystem 28; then inputs to the preset volume control valve portion of meter subsystem the desired gallon quantity of heating oil to be delivered, if a predetermined quantity is to be delivered. The delivery person then actuates the flow valve lever (not shown) of the meter subsystem; then removes the nozzle-valve 30 of the hose 48 from its resting place at drip pan 50; and then inserts the nozzle-valve 30 into the fill pipe or opening of the customer tank or container 32, having pulled sufficient hose 48 from reel 46 in the course of getting to the location of the customer container fill port. The nozzle-valve 30 is opened by the delivery person so the pump 26 flows heating oil into the customer container. Meter subsystem 28 automatically stops the flow of heating oil based on the predetermined quantity which the delivery man had programmed into the meter subsystem. Alternatively, if there is no predetermined programmed quantity, valve 30 is closed by the delivery person to cease flow based on the amount in the customer's heating oil storage tank or container. The hose with closed nozzle-valve 30 is then returned to the drip pan 50 (or other resting place) and the hose 48 is retracted onto reel 46 with the aid of a motor (not shown) which powers the reel, or by means of a substitute hand crank (not shown). Power to the pump motor and the control system is deactivated and preferably valve 54 is closed by turning handle 59. A record of the delivery, namely a ticket receipt printed by the meter subsystem, is given to the customer and or is taken back to the dealer's place of business.

While the foregoing description has concentrated on apparatus comprising a battery powered pump, one or more battery, and a just-under 119 gallon tank, in other embodiments of the apparatus, there are no batteries on the skid and the pump is powered a separate power source, such as alternating current from a generator or public utility, or one or more batteries which are independently provided. In a further variation, the tank of such embodiment of apparatus may have a tank of much less than about 119 gallon capacity. For example, the tank may have about 50 gallon capacity, so that when filled with heating oil. An embodiment of apparatus having a smaller tank may also lack a battery and instead be powered by either a separate battery, or—particularly when not on a truck, by alternating current from an inverter, generator, or public power source. Such a smaller-tank apparatus having a filled tank can weigh about 500 pounds or less. That can make the apparatus more easily handled, including when it is set on a small cart and moved about for semi-stationary commercial dispensation of heating oil at a dealer yard.

Home heating oil (HHO) consists of a mixture of petroleum-derived hydrocarbons. During petroleum distillation, HHO condenses at between 250 and 350° C. (482 and 662° F.). No. 2 heating oil produces about 128,000 to 138,000 British thermal units per US gallon when combusted and weighs about 7.2 pounds per U.S. gallon. It has a flash point of about 52° C. (126° F.). Its viscosity is in the range 2.5 to 7 centistokes at room temperature. HHO is by U.S. law dyed red to enable persons enforcing motor vehicle fuel tax laws to detect illicit use in over-the-road motor vehicles. Tank trucks having more than 119 gallons capacity tanks and transporting HHO must display a specified federal-mandate placard bearing the number NA 1993.

HHO, which should meet ASTM standard D396, is distinct from diesel fuel which is used in internal combustion engines of motor vehicles. Compared to HHO, diesel fuel typically has certain more particular trace element compositional limits, for instance for sulfur, and it has additives, to tailor it for its internal combustion and fuel injection pump purposes. Diesel fuel is subject to SAE International standards such as J313. Diesel fuel, which is not dyed, is most often distributed and sold to the public through channels of commerce which include automotive and truck filling stations where stationary pumping and metering systems are used. Biodiesel is a fuel oil derived from vegetable and animal fats, and it may comprise a portion of HHO within the ASTM D396 standard. The parts of apparatus 20 which contact HHO, particularly seals and hose parts are accordingly constructed of specialized materials which accommodate hydrocarbons without degradation. On the other hand the metal parts which are in contact with HHO may be mild steel, as mentioned above, in view of the general lubricious and corrosion-protective nature of HHO.

The invention, with explicit and implicit variations and advantages, has been described and illustrated with respect to several embodiments. Those embodiments should be considered illustrative and not restrictive. Any use of words such as "preferred" and variations suggest a feature or combination which is desirable but which is not necessarily mandatory. Thus embodiments lacking any such preferred feature or combination may be within the scope of the claims which follow. Persons skilled in the art may make various changes in form and detail of the invention embodiments which are described, without departing from the spirit and scope of the claimed invention.

The invention claimed is:

1. Apparatus for dispensing heating oil having a length, a front end, a rear end, and a lengthwise center point, comprising:
   a skid;
   a tank proximate the rear end, having a top, a port at the top, and a cap attached to the port;
   a pump in oil flow communication with the tank;
   a meter subsystem in oil flow communication with the pump;
   an electric motor mechanically connected to the pump, for powering the pump;
   at least one battery, electrically connected to electric motor;
   one or more stanchions, each stanchion extending upwardly from the skid between the front end and said center point;
   a hose reel, mounted on the one or more stanchions and configured to unreel hose from the front end while rotating in a vertical plane; and,
   a length of hose in oil flow communication with the meter subsystem, extendably mounted on the hose reel;
   wherein the tank, pump, meter subsystem, at least one battery, and hose reel are mounted directly or indirectly on the skid, and the meter subsystem is positioned near the front end of the apparatus;
   wherein the tank has a volume up to about 119 gallons and no more; and,
   wherein, when the tank is filled with heating oil the apparatus weighs less than 1,500 pounds.

2. The apparatus of claim 1 wherein said at least one battery and said pump are located between the tank and the front end.

3. The apparatus of claim 1 wherein said vertical plane is parallel to the length of the apparatus.

4. The apparatus of claim 1 wherein the weight of the apparatus is balanced in the lengthwise direction about said center point.

5. The apparatus of claim 1 having a tank filled with heating oil, wherein more than half the apparatus weight is between the rear end and the center point.

6. The apparatus of claim 1 further comprising: an air and vapor eliminator positioned between the pump and the meter subsystem; and, a first pipeline for carrying air or vapor running from said eliminator to said tank port.

7. The apparatus of claim 1 further comprising: a second pipe line running from the pump to the said tank port, for carrying air from the pump.

8. The apparatus of claim 7 further comprising a flow valve in said second pipe line, the flow valve having an operating handle positioned at the front end of the apparatus.

9. The apparatus of claim 1 further comprising: an air and vapor eliminator positioned between the pump and the meter subsystem; and, a first pipe line for carrying air or vapor running from said eliminator to said tank port; and, a second pipe line running from the pump to the said tank port, for carrying air from the pump.

10. The apparatus of claim 1 wherein the skid has a rectangular shape, further comprising: four D-rings, one each attached to a corner of the rectangular skid.

11. The apparatus of claim 10 in combination with a truck having a cab portion and a bed extending in rear direction therefrom; wherein the apparatus is secured and carried within said bed as removable cargo; wherein the apparatus second end is positioned within the bed closer to said cab portion than is the apparatus front end; further comprising: a plurality of tie-downs, at least one tie-down connecting each D ring to the bed of the pickup truck.

12. The apparatus of claim 1 further comprising a register connected to the meter subsystem for displaying the oil quantity which flows through the meter subsystem and for producing a paper receipt.

13. The apparatus of claim 1 wherein the apparatus meets NTEP certification.

14. Apparatus for dispensing heating oil in combination with a truck, the apparatus having a length, a front end, a rear end, and a lengthwise center point, the truck having a cab portion and a bed extending rearward direction therefrom;

wherein the apparatus is carried and secured within said bed as removable cargo, and wherein the rear end of the apparatus is positioned within the bed at a location which is closer to said cab portion than is the front end of the apparatus;

the apparatus comprising:

a skid;

a tank proximate the rear end, having a top, a port at the top, and a cap attached to the port;

a pump in oil flow communication with the tank;

a meter subsystem in oil flow communication with the pump;

an electric motor mechanically connected to the pump, for powering the pump;

at least one battery, electrically connected to electric motor;

one or more stanchions, each stanchion extending upwardly from the skid between the front end and said center point;

a hose reel, mounted on the one or more stanchions and configured to unreel hose from the front end while rotating in a vertical plane; and, a length of hose in oil flow communication with the meter subsystem, extendably mounted on the hose reel;

wherein the tank, pump, meter subsystem, at least one battery, and hose reel are mounted directly or indirectly on the skid, and the meter subsystem is positioned near the front end of the apparatus; and wherein the tank has a volume capacity of up to about 119 gallons of heating oil and no more; wherein when the tank contains about 119 gallons of heating oil the apparatus weighs no more than 1,500 pounds.

15. The combination of apparatus and truck of claim 14 wherein the tank contains heating oil sufficient to make the weight of the apparatus rear end more than half the weight of the whole apparatus.

16. The combination of apparatus and truck of claim 15 wherein the tank has a volume sufficient to contain about 119 gallons of heating oil and no more.

17. The apparatus of claim 14 wherein the combination has a gross vehicle weight of no more than 10,000 pounds.

* * * * *